United States Patent [19]

Kwong et al.

[11] Patent Number: 4,760,487
[45] Date of Patent: Jul. 26, 1988

[54] DIFFERENTIAL RELAY FOR PROTECTING AN ELECTRICAL POWER TRANSMISSION SYSTEM

[75] Inventors: Wah S. Kwong, Stafford; Adrian O. Newbould, Hixon, both of England

[73] Assignee: The General Electric Company p.l.c., England

[21] Appl. No.: 849,750

[22] Filed: Apr. 9, 1986

[30] Foreign Application Priority Data

Apr. 12, 1985 [GB] United Kingdom ............... 8509422

[51] Int. Cl.⁴ ............................................. H02H 3/30
[52] U.S. Cl. ..................................... 361/64; 361/66; 361/87
[58] Field of Search ................. 361/62, 64, 63, 66, 361/87

[56] References Cited

U.S. PATENT DOCUMENTS

| | | | |
|---|---|---|---|
| 3,944,888 | 3/1976 | Clark | 361/46 |
| 4,275,429 | 6/1981 | Church et al. | 361/64 |
| 4,538,196 | 8/1985 | Son et al. | 361/64 |
| 4,612,594 | 9/1986 | Yamaura et al. | 361/66 |
| 4,674,002 | 1/1987 | Li et al. | 361/66 |

FOREIGN PATENT DOCUMENTS

| | | |
|---|---|---|
| 2022374 | 12/1979 | United Kingdom ............ 361/64 |
| 2072974 | 10/1981 | United Kingdom . |
| 2075776 | 11/1981 | United Kingdom . |

Primary Examiner—J. R. Scott
Assistant Examiner—Jeffrey A. Gaffin
Attorney, Agent, or Firm—Kirschstein, Kirschstein, Ottinger & Israel

[57] ABSTRACT

A differential relay includes two apparatus each associated with a different monitoring point on the line being protected by the relay. Each apparatus includes means for deriving digital data representative of the current monitored at the respective point, at time intervals defined by a clock within the apparatus. The two points are linked by a digital data communication channel, and information transmitted between the two points is used to compute digital data for the two points at substantially the same time, from digital data derived at different instants at the two points.

11 Claims, 3 Drawing Sheets

DIFFERENTIAL RELAY FOR PROTECTING AN ELECTRICAL POWER TRANSMISSION SYSTEM

BACKGROUND OF THE INVENTION

1. Field of the Invention

This invention relates to relays for protecting an electrical power transmission system comprising a two or more ended electrical feeder. In particular the invention relates to differential relays which operate to protect the system when the difference between the value of an electrical quantity, usually current, monitored at two or more different points on the feeder exceeds a predetermined amount.

2. Description of Related Art

In recent years differential relays have been developed which use digital data transmission to transmit the necessary data regarding the monitored electrical quantities between the monitoring points on the feeder. Such differential relays are generally more reliable and faster than relays using analog tansmission. Differential relays using digital data transmission do, however, suffer the disadvantage that as digital data, unlike continuous analog signals, represent the value of the monitored electrical quantity at discrete time intervals, it is necessary that some form of synchronisation be provided so that digital data collected at different points on the feeder can be aligned to the same time instant. Known differential relays using digital data transmission solve this synchronisation problem by providing an external radio clock, but this leads to additional cost and complexity, and furthermore a suitable radio clock may not be available to all users of the power transmission system. Other known differential relays using digital data transmission solve the synchronisation problem by using a clock signal derived from the communication multiplexing equipment, but this approach suffers the problem that the derivation of the clock signal is very dependent on the actual design of the communication multiplexing equipment, the network configuration and the control hierarchy adapted: as the relay would have to work with a variety of communication equipment, the cost for developing different clock interfaces could be prohibitive. Furthermore, a clock source may not be available if the relay is to be used over a direct non-multiplexing link.

In U.K. Patent Application No. GB 2072974A there is described a differential relay using digital data transmission in which independent clocks are provided at the monitoring points along the line to be protected, the clocks defining the time intervals at which electrical data is measured at the monitoring points. Digital data relating to the current measured at a local monitoring point is transmitted to a remote monitoring point and stored in a first memory, while digital data relating to the current measured at the remote monitoring point is stored in a second memory. A shift register is arranged to shift through the data in the first memory to correct the data therein by a factor corresponding to the transmission time of the data collected at the local monitoring point between the local and remote monitoring points. The data collected at sampling times $t_1+\alpha$, $t_2+\alpha$, $t_3+\alpha$—at the remote monitoring point is then compared with the correct data collected at sampling times $t_1$, $t_2$, $t_3$—at the local monitoring point, where $\alpha$ is the time interval between the sampling times at the two points, to determine whether the relay is to operate.

Such a relay suffers the disadvantages however that in order to achieve a reasonable amount of accuracy, a very high sampling rate must be used for the derivation of data at the local monitoring point.

SUMMARY OF THE INVENTION

It is an object of the present invention to provide a differential relay using digital data transmission, with independent clocks defining the time intervals at which electrical data is measured at the monitoring points capable of operation at lower sampling rates.

According to the present invention a differential relay operative to protect an electrical feeder is an electrical power transmission system dependent on the differences in an electrical quantity monitored at different monitoring points on the feeder comprises: a respective apparatus including means for deriving digital data representative of the value of the electrical quantity at the point, at time intervals defined by a respective clock within the apparatus; a digital data commmunication channel linking the monitoring points; and means for transmitting through the communication channel a polling message from a first said apparatus located at a first monitoring point, to a second said apparatus located at a second monitoring point, the second apparatus including means responsive to the polling message to return a data message to the first apparatus containing an indication of the value of the digital data derived at the second point said first apparatus utilising the data message to compute digital data for the first and second points at substantially the same instant.

BRIEF DESCRIPTION OF THE DRAWINGS

One differential relay in accordance with the invention will now be described, by way of example only, with reference to the accompanying drawings in which.

DETAILED DESCRIPTION OF THE PREFERRED EMBODIMENT

Figure 1:
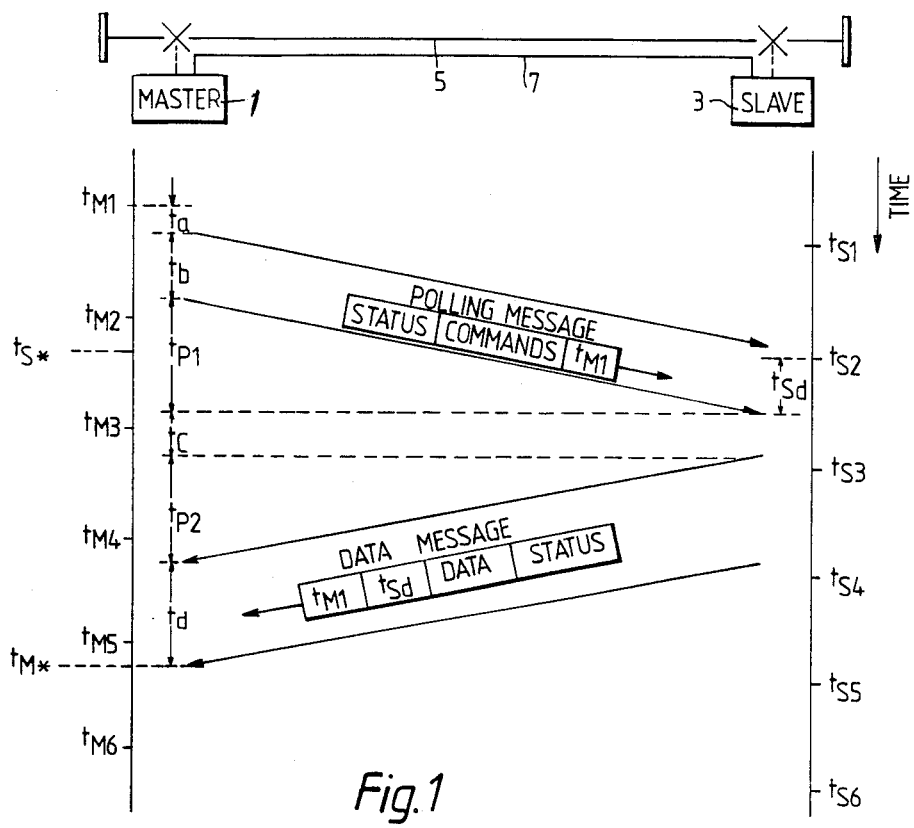
FIG. 1 is a graphical representation of the operating principle of the relay.
Figure 5:
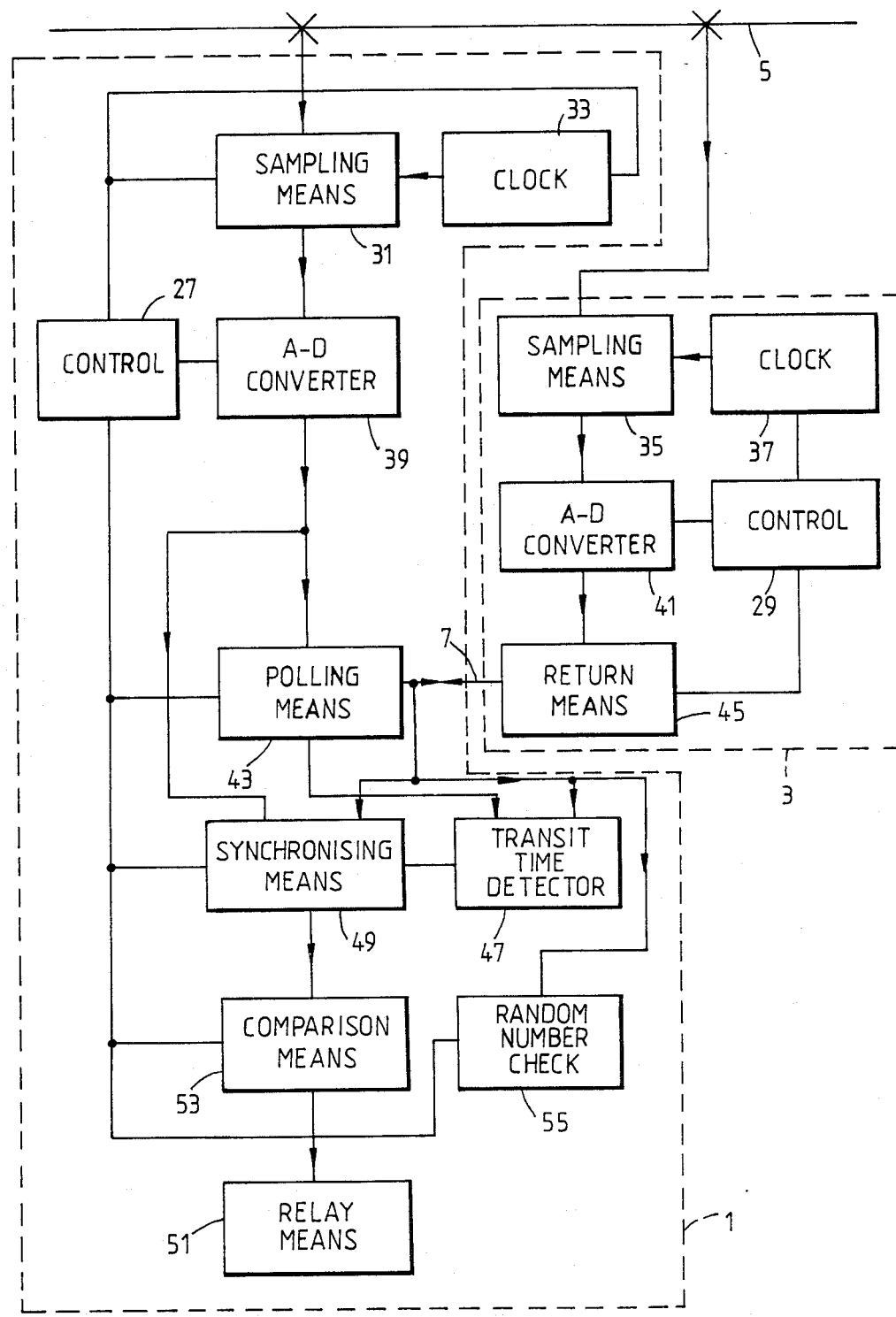
FIG. 5 is a diagram illustrating the master and slave apparatuses in more detail.

Referring firstly to FIG. 1, the relay comprises a master apparatus 1, and a number of slave apparatus 3, situated at the other ends of a multi-ended electrical feeder 5, only one such slave apparatus 3 being shown in the figure for simplicity, each apparatus being under the control of one or more microprocessor-based control means 27 or 29. Referring now also to FIG. 5, the master apparatus includes sampling means 31 which samples current signals at its end of the feeder 5 at time intervals $t_{M1}$, $T_{M2}$ etc. which are defined by a free-running clock incorporated within the master apparatus as indicated in FIG. 5. The slave apparatus 3 includes sampling means 35 which samples current signals at its end of the feeder at time intervals $t_{S1}$, $T_{S2}$ which also need not be identical but are defined by an independent free-running clock 37 incorporated within the slave apparatus, the sampling times at the master and slave ends of the feeder not necessarily being coincident. The sampling times may even be at slightly different frequencies. The sampled current signals at each end of the feeder are converted in analog to digital converter means 39 and 41 respectively to digital signals representing the instantaneous values of the three phase currents and the neutral current at the end, and may contain unwanted d.c. offset, harmonics, and high frequency components. The master and slave apparatus thus contain means for filtering the data, and preprocessing it to a form suitable for the calculation of the magnitudes of differential and bias currents as further described hereafter.

Figure 3:
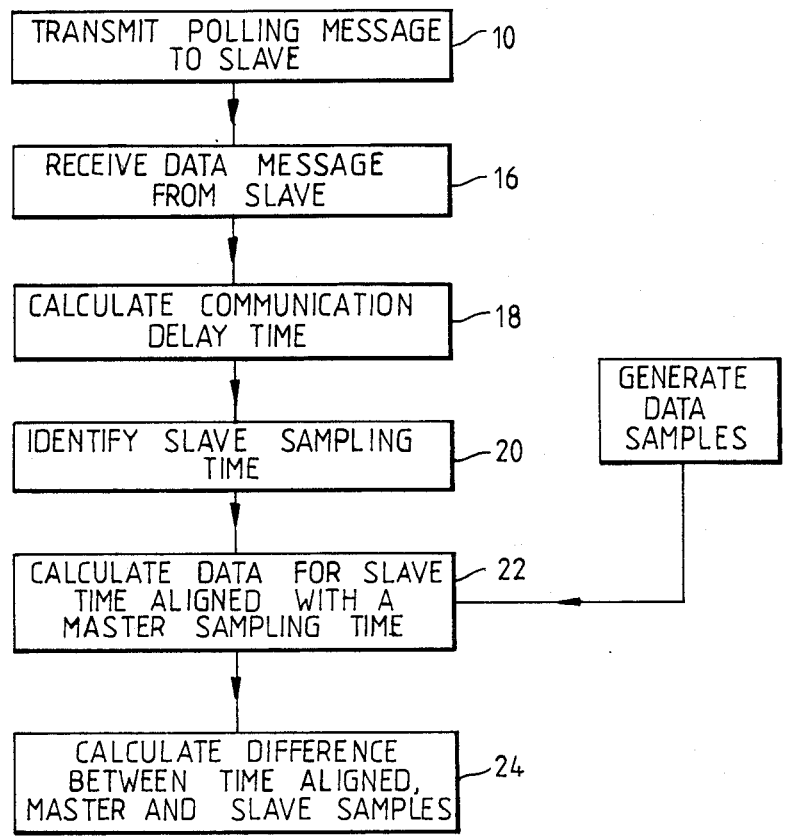
FIGS. 3 and 4 are flow charts illustrating the operation of microprocessor controlled master and slave apparatuses incorporated in the relay.
Figure 4:
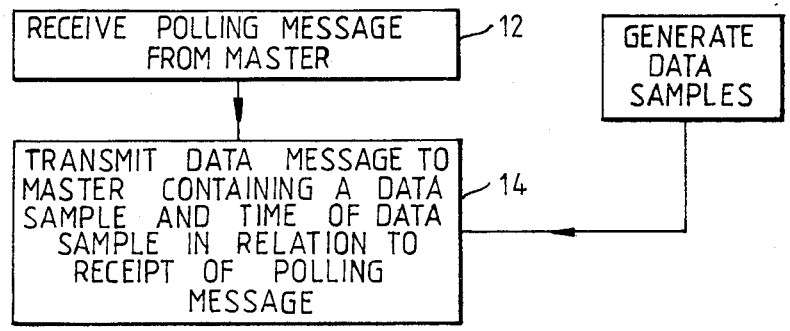

At required times, for example after the time interval $t_{M1}$, a polling means 43 in the master apparatus 1 sends a polling message (see block 10 in FIG. 3) down a digital data communication channel indicated as 7 to the slave apparatus 3 (see block 12 in FIG. 4). This polling message contains a time tag corresponding to $t_{M1}$, and command and status information. The slave apparatus 3 includes return means 45 which responds to the polling message (see block 14 in FIG. 4) by returning a data message to the master apparatus (see block 16 in FIG. 3), containing the polling time tag $t_{M1}$, the time between the most recent slave apparatus sampling and the arrival of the polling message, the most recently filtered current data sampled by the slave apparatus, and other status information. Using the send-off time of the polling message, and the arrival time of the slave data message, a transit time detector means 47 in the master apparatus is then able to calculate the communication channel delay time, and to time align the slave data to the master data in a synchronizing means 49 using a vector transformation technique as described hereafter. The master apparatus then operates a relay means 51 to protect the feeder when the difference between the time aligned current values at the two ends of the feeder 5 exceeds a predetermined value, as detected by a comparison means 53.

The one-cycle window Fourier signal processing method is used to filter and preprocess the current signals measured at each end of the feeder. The algorithm for this method can be expressed as:

$$I_s = \frac{2}{N} \sum_{n=1}^{N-1} \sin nw\Delta t \cdot i_n$$

$$I_c = \frac{2}{N} \left( \frac{i_0}{2} + \frac{i_N}{2} + \sum_{n=1}^{N-1} \cos nw\Delta t \cdot i_n \right)$$

where

N is the number of samples measured per cycle of the current signal in the feeder;
w is the fundamental angular frequency of the current signal;
$\Delta t$ is the sampling time;
$i_n$ is the instantaneous value of the current signal measured at time $t_n$
$I_s$ is the Fourier sine integral of the current signal; and
$I_c$ is the Fourier cosine integral of the current signal.

If the fundamental component of the current signal can be shown to be $I \sin(wt + wt\,\theta)$ where $\theta$ is a phase angle, then it can be shown that:

$$I_s = I \cos \theta$$

$$I_c = I \sin \theta$$

As the phase angle $\theta$ is related to the time reference of the data window, $I_s$ and $I_c$ are not static, but are sinusoidal quantities. The phasor $I = (I_s + jI_c)$ thus represents a vector rotating in an anticlockwise direction on the complex plane at the angular frequency w, from which the magnitude of the current signal i may be extrapolated.

Assuming the master apparatus decides to send a polling message to the slave apparatus at time $t_a$ after data sampling at $t_{M1}$, the polling means 43 of the master apparatus will take some time $t_b$ to send out the whole polling message. If the transmit channel propagation delay time is $t_{p1}$, then the end of the polling message will have arrived at the slave apparatus at time $(t_{M1}+t_a+t_b+t_{p1})$. The returned data message, containing the polling time tag $t_{M1}$, the time between the slave sampling $t_{S2}$ and the arrival of the polling message $t_{sd}$, the filtered $I_s$, $I_c$ data last produced by the slave apparatus at time $t_{S2}$, and other status information will have arrived back at the master apparatus at time $t_{M^*}$ where $$t_{M^*} = (t_{M1} + t_a + t_b + t_{p1} + t_c + t_d + t_{p2})$$

where $t_c$ is the processing time the slave apparatus takes before it starts to send off the data message;
$t_d$ is the time the communication interface of the slave apparatus takes to send out the whole data message; and
$t_{p2}$ is the receive channel propagation delay.

If it is assumed that the trensmit and receive channels have the same propagation delay time, i.e. $t_{p1}=t_{p2}$, as $t_a$, $t_b$, $t_c$ and $t_d$ are all known quantities, then the channel propagation delay time $t_p$ may be calculated (see block 18 in FIG. 3) from:

$$t_{p1} = t_{p2} = t_p = (t_{M^*} - (t_{M1} + t_a + t_b + t_c + t_d))/2$$

After estimating the value of $t_p$, the master apparatus is then able to identify the sampling time, $t_{S^*}$ of the received slave data (see block 20 in FIG. 3) from the expression:

$$t_{S^*} = t_{M^*} - (t_{sd} + t_c + t_d + t_p)$$

After identifying $t_{S^*}$, the slave data may then be time aligned with the master data (see block 22 in FIG. 3). As can be seen in FIG. 1, in the particular relay being described by way of example, $t_{S^*}$ happens to be equal to $t_{S2}$. The master apparatus should identify, therefore, that the slave data are sampled at a time between $t_{M2}$ and $t_{M3}$, so that the slave data must be aligned to these times. Alignment to both these times is required, as this allows differential protection comparison to take place (see block 24 in FIG. 3) on every data sample of the master apparatus, while requiring the slave apparatus to be polled for data only once every two data samples, so reducing the data bandwidth requirement.

Using a look-up table, the parameters $(a+jb)$ required to perform a phase shift on $(I_s+jI_c)$ for the slave data, corresponding to the time $(t_{M3}-t_{S^*})$ may be obtained.

The phasor value of the slave current $I_{S3}$ at time $t_{M3}$ may then be calculated from:

$$\begin{aligned} I_{S3} &= (I_s + jI_c)(a + jb) \\ &= (aI_s - bI_c) + j(bI_s + aI_c) \end{aligned}$$

The value of the slave current at time $t_{M2}$ can be obtained likewise by rotating $I_{S3}$ backward by a fixed angle corresponding to the sampling time period.

Figure 2:
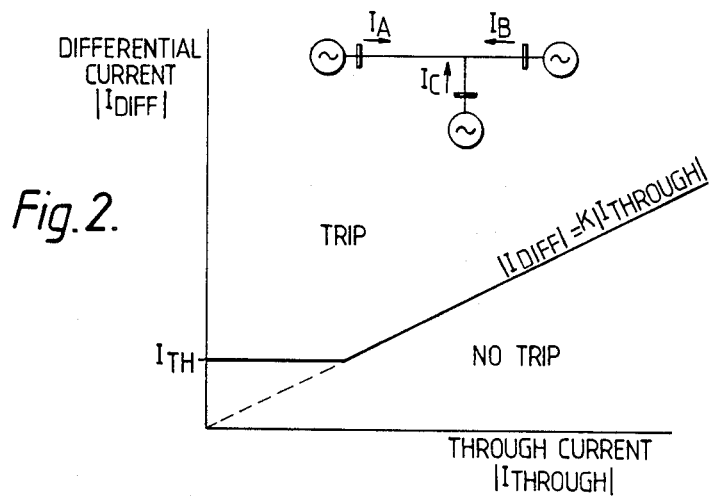
FIG. 2 illustrates the differential protection characteristics of the relay.

Referring now also to FIG. 2, if $I_A$, $I_B$, $I_C$, ... are the current signals measured at ends A, B, C ... of the protected feeder, then the differential current, $I_{diff}$, and the through current $I_{through}$ are defined as:

$$I_{diff} = I_A + I_B + I_C + \ldots$$

$$I_{through} = |I_A| + |I_B| + |I_C| + \ldots$$

As indicated in FIG. 2, a percentage biased differential protection characteristic is used for the relay, the tripping criteria being:

$$|I_{diff}| > k(|I_A| + |I_B| + |I_C| + \ldots)$$

and $$|I_{diff}| > I_{th}$$

where
k is the bias coefficient and
$I_{th}$ is the minimum differential current value for trip protection.

The microprocessor incorporated in the master apparatus then calculates $|I_{diff}|$, $|I_A|$, $|I_B|$ ... from the corresponding vector components $I_s$, $I_c$ using a linear approximation technique to perform the equivalent of the equality $$|I| = \sqrt{(I_s^2 + I_c^2)}$$

so as to determine from the monitored values of current after they have been time aligned whether to operate the relay to protect the feeder.

The microprocessor may be self manipulating to vary the threshold and through current settings to produce an adaptive relay characteristic for improved sensitivity and stability.

In one particular relay in accordance with the invention adopting the ISO//CCITT's high level data link control communication protocol, for the data message, the information field will suitably contain the polling time tag (1 byte), the slave sampling delay time $t_{sd}$ (1 byte), $I_s$ and $I_c$ of the phase and neutral current signals (16 bytes), and status information (1 byte). The whole message frame, would therefore be 25 bytes long, have a protocal efficiency of 76%, and take about 3.75 ms to transmit through a single 64 kbps data channel. It will, therefore be possible to share the communication link with other signalling and telecommunication equipment. As only one data message needs to be transmitted for each two data samples, a suitable sampling rate would be 8 samples per cycle of the mains supply, the resulting average relay operating time being about 26 ms for 50Hz operation. It will be appreciated however that this performance represents a balance of operating speed, and communication requirement and does not represent the limit of the relay. Typically the relay will have sampling rates of between 400 to 800 per second, these relatively low sampling rates enables the use of low cost electronic components in the relay. Faster operating times may be achieved by using wider bandwidth channels, whilst slower, more economical channels may be used for applications which do not required phase selection. It will be appreciated that any form of data communication channel may be used in a relay in accordance with the invention, such as fibre optic links, or conventional communication lines with adequate bandwidth. As the relay is microprocessor based however, a particular advantage of a relay in accordance with the invention is that it is easily adapted to work with different communication equipment by minor changes in the interfacing hardware.

It will also be appreciated that as the channel delay time $t_p$ is calculated for each data poll, any changes on the communication channel are monitored, this being particularly important where the communication time is part of a switched telecommunication network.

It will also be appreciated that as the time tag $t_{M1}$ is incorporated in both the polling message and the data message, the time tag may be used by means 55 (see FIG. 5) to perform the function of a random number check on the communication and processing facilities of the relay.

It will also be appreciated that whilst in the particular relay described herebefore by way of example there is a master apparatus, and a number of slave apparatus, the invention is equally applicable to master-master arrangements in which the relay can both send a poll message and respond to a polling message at the same time. Whilst such a master-master arrangement may be applicable in a two-ended feeder system generally horewver, master-slave arrangements in multi-ended systems are advantageous as they lower the communication and processing requirements.

It will also be appreciated that each master or slave apparatus may, in itself include a means for back-up protection of the feeder. Thus in the event of the failure of the communication channel, or communication equipment, the protective equipment at the ends of the feeder may be given the option of staying idle or operating under a stand-alone mode as a form of back-up protection. For example the protection equipment may operate as an overcurrent protection relay based on the local $I_s$, $I_c$ values measured.

We claim:

1. A differential relay arrangement for protecting an electrical feeder in an electrical power transmission system, comprising:
   (A) a first apparatus at a first monitoring point on the feeder, including
      (a) a first clock means for generating a series of first timing intervals,
      (b) first sampling means for sampling an electrical quantity at the first monitoring point at each of said first timing intervals to generate first electrical quantity samples,
      (c) means for generating forst digital data representative of the first electrical quantity samples;
   (B) a second apparatus at a second monitoring point on the feeder remote from the first monitoring point, including
      (a) a second clock means for generating a series of second timing intervals independently of the first clock means,
      (b) second sampling means for sampling the electrical quantity at the second monitoring point at each of said second timing intervals to generate second electrical quantity samples,
      (c) means for generating second digital data representative of the second electrical quantity samples;
   (C) a digital data communication channel linking the first and the second monitoring points;

(D) polling means in the first apparatus, for polling the second apparatus by transmitting a polling message from the first apparatus in one direction along the communication channel to the second apparatus;

(E) return means in the second apparatus and responsive to the polling message, for generating and returning a return data message in he opposite direction along the communication channel to the first apparatus, said return data message containing one of the second digital data representative of one of the second electrical quantity samples, as well as an indication of the second timing interval at which the sample represented by said one of the second digital data was obtained;

(F) synchronizing means in the first apparatus and responsive to the return data message, for time aligning the sample represented by said one of the second digital data and the sample represented by said one of the first digital data to substantially the same instant of time;

(G) comparison means for comparing said time-aligned samples, and for generating a protection signal when the difference between said one of the second digital data and said one of the first digital data exceeds a predetermined threshold value; and (H) relay means responsive to the protection signal, for disconnecting the feeder from the power transmission system upon generation of the protection signal.

2. The arrangement of claim 1, wherein said return data message also contains an indication of the elapsed time between the time of taking the sample represented by said one of the second digital data and the time of receipt of the polling message.

3. The arrangement of claim 1, wherein said first apparatus further includes means for determining the transit times of the polling message and the return data message along the communication channel.

4. The arrangement of claim 3, wherein said first apparatus further includes means for determining the elapsed time between the transmission of the polling message and the receipt of the return data message, and for determining the transit times from said elapsed time.

5. The arrangement of claim 1, werein said polling message includes a time tag indicative of one of the first timing intervals at which the sample represented by said one of the first digital data was taken.

6. The arrangement of claim 5, wherein said return data message also includes the time tag.

7. The arrangement of claim 6, wherein said first apparatus further includes means responsive to receipt of the time tag, for performing a random number check on the relay arrangement.

8. The arrangement of claim 1, wherein said generating means of said second apparatus includes means for filtering the second electrical quantity samples to remove dc and harmonic components.

9. The arrangement of claim 1, wherein the polling means transmits the polling message only once for every two generations of second digital data.

10. The arrangement of claim 1, wherein the electrical quantity being sampled is electrical current.

11. The arrangement of claim 1, wherein each of the first and the second apparatus includes separate microprocessor-based control means.

* * * * *